US012790429B2

(12) United States Patent
Funahashi et al.

(10) Patent No.: US 12,790,429 B2
(45) **Date of Patent: *Nov. 10, 2026**

(54) SURFACE-TREATED FILLER, METHOD FOR PRODUCING SURFACE-TREATED FILLER, AND HEAT CONDUCTING COMPOSITION

(71) Applicant: Resonac Corporation, Tokyo (JP)

(72) Inventors: Hajime Funahashi, Tokyo (JP); Hikaru Satoh, Tokyo (JP); Hajime Yukutake, Tokyo (JP); Ikue Kobayashi, Tokyo (JP)

(73) Assignee: Resonac Corporation, Tokyo (JP)

( * ) Notice: Subject to any disclaimer, the term of this patent is extended or adjusted under 35 U.S.C. 154(b) by 594 days.

This patent is subject to a terminal disclaimer.

(21) Appl. No.: 18/224,159

(22) Filed: Jul. 20, 2023

(65) Prior Publication Data

US 2024/0026055 A1 Jan. 25, 2024

(30) Foreign Application Priority Data

Jul. 22, 2022 (JP) ................................ 2022-117041

(51) Int. Cl.
*C08F 292/00* (2006.01)
*C08L 83/04* (2006.01)

(52) U.S. Cl.
CPC ............ *C08F 292/00* (2013.01); *C08L 83/04* (2013.01); *C08L 2205/025* (2013.01); *C08L 2205/03* (2013.01)

(58) Field of Classification Search
CPC .. C08F 292/00; C08L 83/04; C08L 2205/025; C08L 2205/03; C08G 77/50; C08K 3/10; C08K 3/28; C08K 9/08; C08K 3/22; C08K 9/06; C08K 9/10; C08K 2003/2227; C08K 2201/014
USPC ........................................................ 523/206
See application file for complete search history.

(56) References Cited

U.S. PATENT DOCUMENTS

| | | | |
|---|---|---|---|
| 5,981,641 A | 11/1999 | Takahashi et al. | |
| 10,604,658 B2 | 3/2020 | Furukawa et al. | |
| 2004/0242762 A1 | 12/2004 | Horikoshi et al. | |
| 2018/0323130 A1 | 11/2018 | Liu et al. | |
| 2024/0043659 A1* | 2/2024 | Funahashi | C08K 9/02 |
| 2024/0101885 A1* | 3/2024 | Satoh | C08L 83/04 |

FOREIGN PATENT DOCUMENTS

| | | | |
|---|---|---|---|
| CN | 104098914 | B | 9/2017 |
| CN | 112694757 | A | 4/2021 |
| EP | 2 194 581 | A1 | 6/2010 |
| JP | 10-110179 | A | 4/1998 |
| JP | 11-49958 | A | 2/1999 |
| JP | 11-307700 | A | 11/1999 |
| JP | 2000-109373 | A | 4/2000 |
| JP | 2001-348483 | A | 12/2001 |
| JP | 2016-534161 | A | 11/2016 |
| JP | 2017-210518 | A | 11/2017 |
| JP | 2018-62607 | A | 4/2018 |
| JP | 2020-73621 | A | 5/2020 |
| JP | 2020-73626 | A | 5/2020 |
| JP | 2020-90584 | A | 6/2020 |
| JP | 2020-180200 | A | 11/2020 |
| JP | 2020-180221 | A | 11/2020 |
| JP | 2021-502426 | A | 1/2021 |
| WO | 2017/078081 | A1 | 5/2017 |
| WO | 2018/016566 | A1 | 1/2018 |
| WO | 2020/137086 | A1 | 7/2020 |
| WO | 2020/262449 | A1 | 12/2020 |
| WO | 2022/014129 | A1 | 1/2022 |
| WO | 2022/126383 | A1 | 6/2022 |
| WO | 2023/119903 | A1 | 6/2023 |

OTHER PUBLICATIONS

Office Action dated Jan. 28, 2026, issued in U.S. Appl. No. 18/354,873.
Office Action dated Jan. 25, 2024, issued in U.S. Appl. No. 18/272,669.
Office Action dated Sep. 30, 2024, issued in U.S. Appl. No. 18/272,669.
Office Action dated Jan. 7, 2026, issued in U.S. Appl. No. 18/272,669.
Office Action dated May 9, 2024, issued in U.S. Appl. No. 18/272,669.
Advisory Action dated Aug. 23, 2024, issued in U.S. Appl. No. 18/272,669.
Office Action dated Apr. 3, 2025, issued in U.S. Appl. No. 18/272,669.
Advisory Action dated Aug. 14, 2025, issued in U.S. Appl. No. 18/272,669.

* cited by examiner

*Primary Examiner* — Hannah J Pak
(74) *Attorney, Agent, or Firm* — Sughrue Mion, PLLC

(57) ABSTRACT

A surface-treated filler obtained by surface-treating a surface of a filler with α-butyl-ω-(2-trimethoxysilylethyl)polydimethylsiloxane having a weight average molecular weight of 500 to 5,000, wherein an adhesion percentage of the α-butyl-ω-(2-trimethoxysilylethyl)polydimethylsiloxane to the filler is from 20.0 to 50.0% by mass.

8 Claims, No Drawings

SURFACE-TREATED FILLER, METHOD FOR PRODUCING SURFACE-TREATED FILLER, AND HEAT CONDUCTING COMPOSITION

FIELD OF THE INVENTION

The present invention relates to a surface-treated filler, a method for producing a surface-treated filler, and a heat conducting composition including the surface-treated filler.

BACKGROUND OF THE INVENTION

Semiconductors are essential for electronic devices and automobiles. These semiconductors can also be a cause of failures, such as when the components of the semiconductor malfunction as the temperature rises. Therefore, various heat dissipating materials are used as heat countermeasures. In recent years, with the increase in the performance of semiconductors, the heat generated by semiconductors is tending to increase more and more, and materials with high thermal conductivity are required to quickly transfer the heat out of the system. One way to increase the thermal conductivity of the heat dissipating material is to increase the filling amount of the filler, which is easy to do and has a very large effect. However, in order to increase the filling amount, it is necessary to take steps such as using an elastomer with as low a viscosity as possible or using a filler with a small specific surface area, but there is a hesitancy to do so due to reasons such as product lineup and price. Therefore, surface treatment of the filler is performed as a method for facilitating the filling of the filler. Typical surface treatment agents include silane coupling agents, which are used to improve filling properties and various physical properties. In particular, long-chain alkylsilanes are relatively good as silane coupling agents from the viewpoint of improving filling properties. However, even with long-chain alkylsilanes, there have been more cases where it is not possible to achieve a high enough filling amount in order to reach the target thermal conductivity.

Further, by increasing the number of carbon atoms in a hydrophobic group of the long-chain alkylsilane, compatibility with the elastomer tends to improve. Hydrophobic groups up to about 18 carbon atoms can be obtained, but when the number of carbon atoms increases, the alkoxy group becomes difficult to hydrolyze, which can lead to such problems that it becomes more difficult to prepare the solution for dispersing the filler, polymerization or polymer film formation of the silane coupling agent may be slow or may not occur, and a large amount of unreacted silane coupling agent may remain in the polymer system. In addition, the unreacted silane coupling agent volatilizes, causing problems such as contamination of the apparatus and deterioration of the heat resistance of the heat dissipating material.

In order to solve these problems, various methods have been proposed for the surface treatment of fillers.

For example, PTL 1 proposes a method of surface-treating a thermally conductive filler by an integral method using dimethylpolysiloxane in which an end of the molecular chain is blocked with a trialkoxysilyl group. PTL 2 proposes a surface-treatment method by an integral method using a dimethylpolysiloxane in which one molecular chain end is blocked with a trialkoxysilyl group and a dimethylpolysiloxane in which both molecular chain ends are blocked with trialkoxysilyl groups. Further, PTL 3 proposes a surface-treatment method by an integral method using dimethylpolysiloxane in which one molecular chain end is blocked with a dialkoxysilyl group. PTL 4 proposes a surface-treatment method by an integral method using dimethylpolysiloxane in which one molecular chain end is blocked with a trialkoxysilyl group.

CITATION LIST

Patent Literature

PTL 1: JP-A-2020-180200
PTL 2: JP-T-2021-502426
PTL 3: CN-B-112694757
PTL 4: U.S. Pat. No. 10,604,658

SUMMARY OF THE INVENTION

Technical Problem

In the method of PTL 1, dimethylpolysiloxane in which one end of the molecular chain is blocked with a trialkoxysilyl group is used as the surface treatment agent, so a filler surface-treated with such dimethylpolysiloxane has excellent compatibility with silicone. However, dimethylpolysiloxane having one end of the molecular chain blocked with a trialkoxysilyl group has poor reactivity, for instance hydrolysis is slow just like long-chain alkylsilanes, and so it is necessary to stir it at high temperature for a long time for using it in surface treatment of a filler in an integral blend method. In addition, it is surprisingly difficult to synthesize a dimethylpolysiloxane in which one end of the molecular chain is blocked with a trialkoxysilyl group, and such materials were only available to silicone rubber manufacturers or laboratories dealing with organosilicon chemistry. Moreover, since the dimethylpolysiloxane has a trialkoxy group, in a condensed silicone system the dimethylpolysiloxane behaves as a cross-linking agent, and there is a problem in that it is difficult to adjust the hardness of the composition.

In the method of PTL 2, dimethylpolysiloxane in which one or both ends of the molecular chain are blocked with a trialkoxysilyl group is used as the surface treatment agent. In the dimethylpolysiloxane, the trialkoxysilyl group at the end(s) of the molecular chain and the polysiloxane group on the molecular chain are not bonded directly, but are bonded via a hydrocarbon group. Such dimethylpolysiloxane is synthesized from a polysiloxane having a SiH group at one end and a silane coupling agent having a vinyl group in the presence of a platinum catalyst. Until several decades ago, polysiloxane having a SiH group at one end was also a material available only to silicone rubber manufacturers or laboratories dealing with organosilicon chemistry, but since it can now be purchased and is commercially available, it has become easier to synthesize such dimethylpolysiloxane. However, since such dimethylpolysiloxane has some bonds via hydrocarbon groups, it tends to degrade at high temperatures. Moreover, when synthesizing such dimethylpolysiloxane, there is a problem in that the purity of the polysiloxane having a SiH group at one end of the raw material is low.

In the method of PTL 3, dimethylpolysiloxane in which one end of the molecular chain is blocked with a dialkoxysilyl group is used as the surface treatment agent. In the dimethylpolysiloxane, the dialkoxysilyl group at the one end of the molecular chain and the polysiloxane group on the molecular chain are not bonded directly, but are bonded via a hydrocarbon group. The synthesis method of the dimethylpolysiloxane is the same as in PTL2. It is known that a dialkoxysilyl group is more easily hydrolyzed than a trialkoxysilyl group, but when the molecular weight of the dialkoxysilyl group is large, there is almost no difference from the hydrolyzability of the trialkoxysilyl group. Therefore, in order to surface-treat the filler by the integral blend method using the dimethylpolysiloxane, it is necessary to stir for a long time at a high temperature.

In the method of PTL 4, dimethylpolysiloxane having a plurality of trialkoxysilyl groups at one end of the molecular chain (including a trifunctional resin structure) is used as the surface treatment agent. Since such a dimethylpolysiloxane has a plurality of trialkoxysilyl groups, it is considered that the probability of bonding with the filler is higher, but when the molecular weight of the siloxane portion is large, there is almost no difference from the hydrolyzability of a single trialkoxysilyl group. Therefore, in order to surface-treat the filler by the integral blend method using the dimethylpolysiloxane, it is necessary to stir for a long time at a high temperature. Moreover, there is a problem in that it is difficult to synthesize the surface treatment agent itself.

The present invention has been made in view of such circumstances, and it is an object thereof to provide a surface-treated filler that can be used as a composition having a low viscosity even when highly filled in a polymer component and can be used as a composition from which a cured product having a high thermal conductivity and a moderate hardness can be obtained, a simpler method for producing such a surface-treated filler, and a heat conducting composition including such surface-treated filler.

Solution to Problem

The present inventors have made intensive studies to solve the above-described problems and have found that the problems can be solved by the following invention.

That is, the present application relates to the following.

[1] A surface-treated filler obtained by surface-treating a surface of a filler with α-butyl-ω-(2-trimethoxysilylethyl)polydimethylsiloxane having a weight average molecular weight of 500 to 5,000, wherein
 an adhesion percentage of the α-butyl-ω-(2-trimethoxysilylethyl)polydimethylsiloxane to the filler is from 20.0 to 50.0% by mass.

[2] The surface-treated filler according to the above [1], wherein the filler is at least one selected from the group consisting of at least one metal selected from the group consisting of silver, copper, and aluminum, silicon, a metal oxide, a nitride, and a composite oxide.

[3] The surface-treated filler according to the above [1] or [2], wherein the filler has a cumulative volume-based 50% particle size of from 0.1 to 30 μm.

[4] A method for producing a surface-treated filler, including:
 a treatment liquid production step of producing a treatment liquid containing α-butyl-ω-(2-trimethoxysilylethyl)polydimethylsiloxane having a weight average molecular weight of from 500 to 5,000, an alcohol, and water;
 a pre-treatment step of mixing a filler and the treatment liquid; and
 a heat treatment step of heat-treating the mixture obtained in the pre-treatment step at a temperature of from 140 to 180° C.

[5] The method for producing a surface-treated filler according to the above [4], including a drying step of drying the mixture obtained in the pre-treatment step before the heat treatment step.

[6] The method for producing a surface-treated filler according to the above [4] or [5], wherein the heat treatment is performed for from 2 to 6 hours.

[7] A heat conducting composition including:
 a polymer component; and
 a filler, wherein
 the filler contains the surface-treated filler according to any of the above [1] to [3], and
 a content of the polymer component is from 2 to 15% by mass and a content of the filler is from 85 to 98% by mass based on the total amount of the heat conducting composition.

[8] The heat conducting composition according to the above [7], wherein a content of the surface-treated filler contained in the filler is from 40 to 60% by mass.

[9] The heat conducting composition according to the above [7] or [8], wherein the polymer component is at least one selected from the group consisting of a thermosetting resin, an elastomer, and an oil.

[10] A cured product of the heat conducting composition according to any of the above [7] to [9].

[11] The cured product of the heat conducting composition according to the above [10], wherein the cured product has a thermal conductivity of 4.0 W/m·K or more.

Advantageous Effects of the Invention

According to the present invention, it is possible to provide a surface-treated filler that can be used as a composition having a low viscosity even when highly filled in a polymer component and can be used as a composition from which a cured product having a high thermal conductivity and a moderate hardness can be obtained, a simpler method for producing such a surface-treated filler, and a heat conducting composition including such surface-treated filler.

DETAILED DESCRIPTION OF THE INVENTION

Hereinbelow, the present invention will be described in detail with reference to one embodiment.

<Surface-Treated Filler>

A surface-treated filler of this embodiment is a surface-treated filler obtained by surface-treating a surface of the filler with α-butyl-ω-(2-trimethoxysilylethyl)polydimethylsiloxane having a weight average molecular weight of 500 to 5,000, wherein an adhesion percentage of the α-butyl-ω-(2-trimethoxysilylethyl)polydimethylsiloxane to the filler is from 20.0 to 50.0% by mass.

The surface-treated filler of this embodiment can be used as a composition having a low viscosity even when highly filled in a polymer component and can be used as a composition from which a cured product having a high thermal conductivity and an appropriate hardness can be obtained.

Examples of the filler used in the present embodiment include metals such as silver, gold, copper, iron, tungsten, stainless steel, aluminum, and carbonyl iron; silicon; oxides, nitrides, carbides, hydroxides, fluorides, and carbonates of metals, silicon, or boron; and carbon.

Examples of the oxide include zinc oxide, aluminum oxide, magnesium oxide, silicon oxide, titanium oxide, iron oxide, calcium oxide, and cerium oxide. Composite oxides can also be used. In particular, the silicon oxide may be a natural product or a synthetic product. Specific examples include smokeless silica, wet silica, dry silica, fused silica, quartz powder, silica sand, silica stone, and silicic anhydride. Examples of the composite oxide include spinel, perovskite, barium titanate, laurel, and ferrite.

Examples of the nitride include aluminum nitride, boron nitride, and silicon nitride.

Examples of the carbide include silicon carbide, and boron carbide.

Examples of the hydroxide include aluminum hydroxide, magnesium hydroxide, iron hydroxide, cerium hydroxide, and copper hydroxide.

Examples of the fluoride include magnesium fluoride, and calcium fluoride.

Examples of the carbonate include magnesium carbonate, and calcium carbonate, and carbonate complex salts such as dolomite can also be used.

Examples of the carbon include graphite, and carbon black.

These can be used alone or as a mixture of two or more types.

From the viewpoint of various particle sizes, various shapes, price, and availability, the filler is preferably at least one selected from the group consisting of at least one metal selected from the group consisting of silver, copper, and aluminum, silicon, a metal oxide, a nitride, and a composite oxide, and more preferably is a metal oxide.

Considering the balance between thermal conductivity and cost, aluminum oxide (alumina) is preferable, and α-alumina is particularly preferable because of its high thermal conductivity. From the viewpoint of high thermal conductivity, aluminum nitride and boron nitride are preferably used, and from the viewpoint of low cost, silica, quartz powder, and aluminum hydroxide are preferably used.

From the viewpoint of imparting thermal conductivity, the thermal conductivity of the filler is preferably 0.5 W/m·K or more, and more preferably 1.0 W/m·K or more.

The shape of the filler is not particularly limited as long as it is a particle, and examples thereof include a spherical shape, a ball shape, a rounded shape, a scaly shape, a broken angular shape, and a fiber shape. A combination of such shapes may also be used.

The filler has a cumulative volume-based 50% particle size of preferably 0.1 to 30 μm, more preferably 0.1 to 20 μm, more preferably 0.2 to 18 μm, further preferably 0.3 to 15 μm, and still further preferably 0.3 to 10 μm, from the viewpoint of high filling properties into the polymer component.

The "cumulative volume-based 50% particle size" (hereinafter sometimes referred to as "D50") herein can be determined from the particle size at which the cumulative volume is 50% in a particle size distribution measured using a laser diffraction particle size distribution analyzer.

The filler preferably has a specific surface area as determined by the BET method of from 0.05 to 10.0 $m^2/g$, more preferably from 0.08 to 9.0 $m^2/g$, and further preferably from 0.10 to 8.0 $m^2/g$. When the specific surface area is within this range, the filler can be filled in the polymer component and can improve the thermal conductivity.

The specific surface area of the filler can be measured by the BET single-point method based on nitrogen adsorption using a specific surface area measurement apparatus, and specifically by the method described in the Examples.

The filler may be subjected in advance to other surface treatments such as a water-resistance treatment and fluidity improvement. Surface treatments such as a water-resistance treatment and fluidity improvement may be applied to the entire surface of the filler, or may be applied to a portion thereof. Examples of the surface-treated filler include a filler obtained by uniformly coating aluminum nitride with nanoparticles such as graphene, a filler obtained by uniformly coating a ceramics filler with silica, and a film-formation filler with water-resistance and insulating properties produced by forming a silicon oxide film on the surface of aluminum nitride by a sol-gel method, water glass or the like.

The α-butyl-ω-(2-trimethoxysilylethyl)polydimethylsiloxane used for the surface treatment of the filler has a weight average molecular weight (Mw) of 500 to 5,000, preferably 600 to 4,500, and more preferably 800 to 4,200. When the Mw is within this range, the percentage of adhesion of the α-butyl-ω-(2-trimethoxysilylethyl)polydimethylsiloxane to the filler can be within the range specified in the present invention.

Two or more types of α-butyl-ω-(2-trimethoxysilylethyl) polydimethylsiloxane having different Mw may be mixed and used.

The Mw is a polystyrene-equivalent molecular weight measured by gel permeation chromatography (GPC) using a standard polystyrene sample with a known molecular weight to create a calibration curve.

In the α-butyl-ω-(2-trimethoxysilylethyl)polydimethylsiloxane, the number of repeating units of dimethylsiloxane is an integer of preferably from 4 to 64, more preferably from 8 to 60, and further preferably from 10 to 56. When the number of repeating units of dimethylsiloxane is within this range, the adhesion percentage of the α-butyl-ω-(2-trimethoxysilylethyl)polydimethylsiloxane to the filler can be within the range specified in the present invention.

There is a functional group such as a hydroxyl group on the filler surface. This functional group and the trimethoxysilyl group of the α-butyl-ω-(2-trimethoxysilylethyl) polydimethylsiloxane chemically bond to fix a hydrolyzate of α-butyl-ω-(2-trimethoxysilylethyl)polydimethylsiloxane to the filler surface.

The adhesion percentage of the α-butyl-ω-(2-trimethoxysilylethyl)polydimethylsiloxane to the filler is from 20.0 to 50.0% by mass, preferably from 22.0 to 48.0% by mass, more preferably from 24.0 to 48.0% by mass, further preferably from 24.0 to 46.0% by mass, and still further preferably from 25.0 to 45.0% by mass. When the adhesion percentage is 20.0% by mass or more, a composition including the surface-treated filler has good curability, and when the adhesion percentage is 50.0% by mass or less, the viscosity of the composition is low even when the polymer component is highly filled, and the cured product can have an appropriate hardness.

The adhesion percentage can be measured by a method conforming to JIS R1675:2007 "Combustion (high-frequency heating)—infrared absorption method", and specifically by the method described in the Examples.

<Method for Producing Surface-Treated Filler>

The method for producing a surface-treated filler of this embodiment includes:

- a treatment liquid production step of producing a treatment liquid containing α-butyl-ω-(2-trimethoxysilylethyl)polydimethylsiloxane having a weight average molecular weight of from 500 to 5,000, an alcohol, and water;
- a pre-treatment step of mixing a filler and the treatment liquid; and
- a heat treatment step of heat treating the mixture obtained in the pre-treatment step at a temperature of from 140 to 180° C.

[Treatment Liquid Production Step]

This step is a step of producing a treatment liquid containing α-butyl-ω-(2-trimethoxysilylethyl)polydimethylsiloxane having a weight average molecular weight of from 500 to 5,000, an alcohol, and water.

As the α-butyl-ω-(2-trimethoxysilylethyl)polydimethylsiloxane, the example described in the section <Surface-treated filler> can be used.

The treatment liquid containing α-butyl-ω-(2-trimethoxysilylethyl)polydimethylsiloxane having a weight average molecular weight of 500 to 5,000, an alcohol, and water is prepared.

Examples of the alcohol include ethanol, isopropanol, and butanol. These can be used alone or as a mixture of two or more types.

The concentration of the alcohol in the treatment liquid is preferably 99.5 to 99.9% by mass from the viewpoint of availability.

The water may be ion-exchanged water or distilled water.

In addition to the α-butyl-ω-(2-trimethoxysilylethyl)polydimethylsiloxane, an alcohol, and water, the treatment liquid may optionally include an acid such as hydrochloric acid and acetic acid; and an organic solvent such as acetone and methyl ethyl ketone (excluding an alcohol).

When the treatment liquid includes an acid, the hydrogen ion concentration of the treatment liquid is preferably from 2 to 10% by mass from the viewpoint of hydrolysis rate and silanol stability.

The alcohol content is preferably from 150 to 400 parts by mass, more preferably from 200 to 350 parts by mass, and further preferably from 200 to 300 parts by mass based on 100 parts by mass of the α-butyl-ω-(2-trimethoxysilylethyl)polydimethylsiloxane. When the alcohol content is 150 parts by mass or more, the treatment liquid can be homogenized (compatibilized), and when the alcohol content is 400 parts by mass or less, a slurry can be formed after the treatment liquid is added to the filler.

The water content is preferably from 0.5 to 10 parts by mass, more preferably from 0.8 to 8 parts by mass, and further preferably from 1 to 6 parts by mass based on 100 parts by mass of the α-butyl-ω-(2-trimethoxysilylethyl)polydimethylsiloxane. When the water content is 0.5 parts by mass or more, hydrolysis of the trimethoxy group proceeds, and when the water content is 10 parts by mass or less, the treatment liquid can be homogenized (compatibilized).

When the treatment liquid includes an organic solvent (excluding an alcohol), the content of the organic solvent is preferably from 50 to 300 parts by mass, more preferably from 100 to 250 parts by mass, and further preferably from 100 to 200 parts by mass based on 100 parts by mass of the α-butyl-ω-(2-trimethoxysilylethyl)polydimethylsiloxane. When the organic solvent is 50 parts by mass or more, the treatment liquid can be homogenized (compatibilized), and when the alcohol content is 300 parts by mass or less, a slurry can be formed after the treatment liquid is added to the filler.

In a sealable container, the α-butyl-ω-(2-trimethoxysilylethyl)polydimethylsiloxane, the alcohol, the water, and if necessary, the acid and organic solvent (excluding an alcohol) are mixed. The order of the mixing of these compounds is not particularly limited, and the compounds may be mixed in any order.

The mixing can be carried out by stirring with a motor equipped with a stirring blade or with a magnetic stirrer, or by mixing each component in a container and rotating the container with a mixing rotor.

The mixing is preferably carried out at from 23 to 80° C. for from 4 to 100 hours, and more preferably at from 23 to 50° C. for from 4 to 72 hours.

[Pre-Treatment Step]

This step is a step of pre-treating a filler by mixing a filler with the treatment liquid obtained in the treatment liquid production step.

As the filler, the filler described in the section <Surface-treated filler> can be used.

The pre-treatment is performed by adding the filler and treatment liquid to a stirring device and stirring and mixing.

Examples of the stirring device include a rotation and revolution stirring device, a Nauta mixer, a high-speed mixer, a Henschel mixer, and a planetary mixer.

The stirring is preferably carried out at from 20 to 70° C. for from 1 to 120 minutes, and more preferably at from 23 to 50° C. for from 1 to 30 minutes.

The amount of the α-butyl-ω-(2-trimethoxysilylethyl)polydimethylsiloxane (hereinafter also simply referred to as "polydimethylsiloxane") added to the filler can be determined from the minimum coating area of the polydimethylsiloxane.

The minimum coating area of the polydimethylsiloxane can be calculated from the following formula (I). The area occupied by the trimethoxysilyl groups in the polydimethylsiloxane is $13\times10^{-20}$ m$^2$.

$$\text{Minimum coating area } (\text{m}^2/\text{g}) \text{ of polydimethylsiloxane} = \frac{\text{Area } (\text{m}^2) \text{ occupied by the trimethoxysilyl groups in polydimethylsiloxane} \times 6.02\times10^{23}}{\text{Weight average molecular weight of polydimethylsiloxane}} \quad \text{(I)}$$

The amount of the α-butyl-ω-(2-trimethoxysilylethyl)polydimethylsiloxane added can be calculated from the following formula (II).

$$\text{Amount } (g) \text{ of polydimethylsiloxane added} = \frac{BET \text{ specific surface area } (\text{m}^2/\text{g}) \text{ of filler} \times \text{amount (g) of filler}}{\text{Minimum coating area } (\text{m}^2/\text{g}) \text{ of polydimethylsiloxane}} \times \frac{\text{Coverage } (\%)}{100} \quad \text{(II)}$$

In formula (II), the coverage is the theoretical amount of polydimethylsiloxane coating the filler, and is preferably from 10 to 100%, and more preferably from 20 to 100%. When the coverage is 20% or more, foaming of the composition containing the surface-treated filler can be suppressed.

The mixture obtained in this way may be subjected to a drying step of drying the mixture before the heat treatment step described below. The drying method is not particularly limited, and for example, air drying may be performed for 4 to 24 hours after the stirring and mixing. The air-drying may be carried out by simply leaving at room temperature (25° C.), or if necessary, the drying may be carried out in a hot air circulating oven at a temperature of from 50 to 80° C.

[Heat Treatment Step]

This step is a step of heat treating the mixture obtained in the pre-treatment step at a temperature of from 140 to 180° C.

After the pre-treatment step, the obtained mixture is heat treated at a temperature of from 140 to 180° C. to bake the treatment liquid.

When the heat treatment temperature is 140° C. or higher, the adhesion percentage of the α-butyl-ω-(2-trimethoxysilylethyl)polydimethylsiloxane to the filler can be increased, and when the heat treatment temperature is 180° C. or lower, degradation of the α-butyl-ω-(2-trimethoxysilylethyl) polydimethylsiloxane can be prevented. The heat treatment temperature is preferably from 145 to 175° C., and more preferably from 150 to 170° C.

Further, the heat treatment time is preferably from 2 to 6 hours, and more preferably from 2 to 5 hours. If the heat treatment time is 2 hours or more, the surface treatment of the filler with α-butyl-ω-(2-trimethoxysilylethyl)polydimethylsiloxane can be sufficiently performed, and the heat temperature time is within 6 hours, coloration due to thermal degradation of the surface-treated filler can be suppressed.

The surface-treated filler obtained in this way may be washed with water or an alcohol. Examples of the alcohol used for the washing include ethanol, and propanol.

<Heat Conducting Composition>

The heat conducting composition of this embodiment contains a polymer component and a filler, wherein the filler contains the above-described surface-treated filler, and the content of the polymer component is from 2 to 15% by mass and the content of the filler is from 85 to 98% by mass based on the total amount of the heat conducting composition.

[Polymer Component]

The polymer component used in this embodiment is not particularly limited, and examples thereof include a thermosetting resin, a thermoplastic resin, an elastomer, and an oil. These may be used alone or as a mixture of two or more types.

From the viewpoint of obtaining the effects of the present invention, the polymer component is preferably at least one selected from the group consisting of a thermosetting resin, an elastomer, and an oil. Thermosetting resin means a material in a state before curing, and as used herein, is not limited to the heat curing type, and may include materials that cure at normal temperature.

Examples of the thermosetting resin include epoxy resins, phenol resins, unsaturated polyester resins, melamine resins, urea resins, polyimides, and polyurethane.

Examples of the thermoplastic resin include polyolefins such as polyethylene and polypropylene; polyesters, nylons, ABS resins, methacrylic resins, acrylic resins, polyphenylene sulfides, fluororesins, polysulfones, polyetherimides, polyethersulfones, polyetherketones, liquid crystal polyesters, thermoplastic polyimides, polylactic acids, and polycarbonates.

The thermosetting resin and the thermoplastic resin may be modified with silicone or fluororesin. Specific examples of modified resins include silicone-modified acrylic resins and fluororesin-modified polyurethanes.

Examples of the elastomer include natural rubber, isoprene rubber, butadiene rubber, 1,2-polybutadiene, styrene-butadiene, chloroprene rubber, nitrile rubber, butyl rubber, ethylene-propylene rubber (EPM, EPDM), chlorosulfonated polyethylene, acrylic rubber, epichlorohydrin rubber, polysulfide rubber, silicone rubber, fluoro rubber, and polyurethane rubber.

Examples of the oil include low-molecular-weight poly-α-olefins, low-molecular-weight polybutenes, silicone oils, and fluorine oils.

These may be used alone or as a mixture of two or more types.

From the viewpoint of availability of a low-viscosity product, the polymer component is preferably polyurethane, silicone rubber, or silicone oil.

As the polymer component, it is preferable to use a component having a viscosity at 25° C. of from 30 to 3000 mPa s, more preferably from 50 to 2000 mPa s, and further preferably from 100 to 1,000 mPa·s. When the viscosity is 30 mPa·s or more, the thermal stability is excellent, and when the viscosity is 3000 mPa·s or less, the viscosity of the composition can be reduced.

The viscosity of the polymer component at 25° C. can be measured using a rotary viscometer based on JIS Z8803: 2011 "Methods for measuring the viscosity of liquids", and specifically by the method described in the Examples.

The content of the polymer component is from 2 to 15% by mass, preferably from 2 to 12% by mass, more preferably from 2 to 10% by mass, and further preferably from 2 to 8% by mass based on the total amount of the heat conducting composition of this embodiment. When the content of the polymer component is 2% by mass or more, thermal conductivity can be imparted, and when the content is 15% by mass or less, the viscosity of the composition and the hardness of the cured product can be appropriate.

[Filler]

The filler used in this embodiment includes the surface-treated filler described above. As the surface-treated filler, those described in the section <Surface-treated filler> can be used.

The content of the surface-treated filler contained in the filler is preferably from 40 to 60% by mass, more preferably from 42 to 56% by mass, and further preferably from 45 to 52% by mass. When the content of the surface-treated filler is 40% by mass or more, it is possible to obtain a heat conducting composition having a low viscosity even when the polymer component is highly filled with the filler, and the cured product of such heat conducting composition has an appropriate hardness. When the content is 60% by mass or less, the cured product can have an appropriate hardness.

From the viewpoint of improving thermal conductivity, the heat conducting composition of this embodiment preferably contains a filler other than the above-described surface-treated filler. The other filler may or may not be surface-treated.

Examples of the other filler include metal oxides, metal nitrides, and metal hydroxides.

Examples of the metal oxide include zinc oxide, alumina, magnesium oxide, silicon dioxide, and iron oxide. Examples of the metal nitride include boron nitride, aluminum nitride, and silicon nitride. Examples of the metal hydroxide include aluminum hydroxide, and magnesium hydroxide.

Considering the balance between thermal conductivity and cost, aluminum oxide (alumina) is preferable, and α-alumina is particularly preferable because of its high thermal conductivity. From the viewpoint of high thermal conductivity, aluminum nitride and boron nitride are suitably used, and from the viewpoint of low cost, silica, quartz powder, and aluminum hydroxide are suitably used.

The other filler has a cumulative volume-based 50% particle size of preferably more than 20 μm and 80 μm or less, more preferably from 25 to 70 μm, further preferably 28 to 60 μm, and still further preferably from 30 to 50 μm, from the viewpoint of improving thermal conductivity and increasing the filling factor.

From the viewpoint of filling properties, the content of the other fillers included in the filler is preferably from 40 to 60% by mass, more preferably from 44 to 58% by mass, and further preferably from 48 to 55% by mass.

The content of the filler is from 85 to 98% by mass, preferably from 88 to 98% by mass, more preferably from 90 to 98% by mass, and further preferably from 92 to 98% by mass based on the total amount of the heat conducting composition of the present embodiment. When the content of the filler is 85% by mass or more, a high thermal conductivity can be imparted, and when the content is 98% by mass or less, the hardness of the cured product can be lowered, and an appropriate hardness can be obtained.

In addition to the above components, the heat conducting composition of this embodiment can optionally contain additives such as a heat-resistant agent, a flame retardant, a plasticizer, a silane coupling agent, a dispersant, and a reaction accelerator within a range that does not affect the cured form and physical properties and does not interfere with the effects of the present invention.

When additives are used, the amount added is preferably from 0.05 to 10.0% by mass, more preferably from 0.1 to 8.0% by mass, and further preferably from 0.15 to 5.0% by mass based on the total amount of the heat conducting composition.

In the heat conducting composition of this embodiment, the total content of the polymer component and the filler is preferably from 90 to 100% by mass, more preferably from 92 to 100% by mass, and further preferably from 95 to 100% by mass.

The heat conducting composition of the present embodiment can be obtained by charging the polymer component, the filler, and other additives that are optionally added into a stirring device, stirring, and kneading. The stirring device is not particularly limited, and examples thereof include a twin roll, a kneader, a planetary mixer, a high-speed mixer, and a rotation/revolution stirrer.

The heat conducting composition of this embodiment has a viscosity at 30° C. of preferably from 300 to 600 Pas, more preferably from 310 to 500 Pas, and further preferably from 320 to 400 Pas.

The viscosity can be measured by a method conforming to JIS K7210:2014 using a flow viscometer, and specifically by the method described in the Examples.

Since the heat conducting composition of this embodiment can obtain a cured product having a low viscosity, a high thermal conductivity, and appropriate hardness, it can be suitably used in exothermic electronic parts such as electronic devices, personal computers, and automotive ECUs and batteries.

<Cured Product of Heat Conducting Composition>

The heat conducting composition of this embodiment can provide a cured product by, for example, injecting it into a mold or the like, optionally drying, and then thermally curing. When the polymer component is a room-temperature curable polymer, the heat conducting composition may be cured by leaving it at a temperature of from 20 to 25° C. for about 5 to 10 days.

The drying may be performed by natural drying or at normal temperature. The heating is preferably performed at a temperature of 50° C. or more and 150° C. or less for 5 minutes or more and 20 hours or less, more preferably at a temperature of 60° C. or more and 130° C. or less for 10 minutes or more and 10 hours or less.

The cured product of the heat conducting composition of the present embodiment preferably has a thermal conductivity of 4.0 W/m·K or more, more preferably 4.5 W/m·K or more, and further preferably 5.0 W/m·K or more.

The thermal conductivity can be measured by a method conforming to ISO22007-2:2008, and specifically by the method described in the Examples.

The cured product of the heat conducting composition of the present embodiment preferably has a hardness measured according to the hardness test (Shore 00) of ASTM D2240 of from 25 to 60, more preferably from 30 to 50, and further preferably from 32 to 45. When the hardness is within this range, the cured product can have an appropriate hardness.

The hardness can be specifically measured by the method described in the Examples.

EXAMPLES

The present invention will now be described in detail with reference to examples, but the present invention is not limited by these examples.

(Raw Material Compounds)

The details of the raw material compounds used in Examples 1 to 22 and Comparative Examples 1 to 19 are as follows.

[Filler]

AES-12: Alumina, manufactured by Sumitomo Chemical Co., Ltd., D50=0.5 μm, specific surface area (BET method)=5.8 $m^2/g$, thermal conductivity=25 W/m·K, specific gravity=3.98 $g/cm^3$ BAK-5: Alumina, manufactured by Shanghai Hakuto Co., Ltd., D50=5 μm, specific surface area (BET method)=0.4 $m^2/g$, thermal conductivity=25 W/m·K, specific gravity=3.98 $g/cm^3$ AS-10: Alumina, manufactured by Showa Denko K.K., D50=40 μm, specific surface area (BET method)=0.5 $m^2/g$, thermal conductivity=25 W/m·K, specific gravity=3.98 $g/cm^3$ The D50, the specific surface area, and the thermal conductivity of the filler were measured by the following measurement methods.

(1) D50

The D50 was determined from the particle size (50% particle size D50) at which the cumulative volume was 50% in a particle size distribution measured using a laser diffraction particle size distribution analyzer (manufactured by MicrotracBEL Corp., trade name: MT3300EXII).

(2) Specific Surface Area

The specific surface area was measured using a specific surface area measurement apparatus (manufactured by Mountech Co., Ltd., trade name: Macsorb MS30) by the single-point BET method based on nitrogen adsorption.

(3) Thermal Conductivity 50 g of alumina was pulverized, then 5% by mass of paraffin was added to the alumina, the mixture was kneaded, the obtained kneaded product was placed in a mold having a diameter of 25 mm and a thickness of 8 mm and molded by cold pressing. Next, the temperature was raised from room temperature (20° C.) to 200° C. over 1 hour in an electric furnace, and degreasing was performed for 2 hours while maintaining the temperature at 200° C. Subsequently, the temperature was raised at a rate of temperature increase of 400° C./hour, firing was carried out at a temperature of 1580° C. for 4 hours, and the fired product was cooled by natural cooling for 4 hours or more to obtain a sintered body. The thermal conductivity of the obtained sintered body was measured according to ISO22007-2:2008 using a hot disk method thermophysical property measuring device (manufactured by Kyoto Electronics Industry Co., Ltd., trade name TPS 2500 S).

[Polymer Component]

DOWSIL™ CY52-276: Solution A (mixture of vinyl group-containing dimethyl silicone rubber and platinum catalyst) and solution B (mixture of vinyl group-containing dimethyl silicone rubber and cross-linking agent), manufactured by Dow Toray Co., Ltd., viscosity at 25° C.=780 mPa·s, thermal conductivity=0.2 W/m·K, specific gravity=0.97 g/cm$^3$ The viscosity and the thermal conductivity of the polymer component (a mixture of the solution A and the solution B at a mass ratio of 1:1) were measured by the following measurement methods.

(1) Viscosity

The viscosity of the polymer component was measured based on JIS Z8803:2011 "Methods for measuring the viscosity of liquids" using a rotational viscometer (manufactured by Toki Sangyo Co., Ltd., product name: TVB-10, rotor No. 3) at 25° C. and a rotation speed of 20 rpm.

(2) Thermal Conductivity

The thermal conductivity of the polymer component was measured in accordance with ISO22007-2:2008 using a hot disk method thermophysical property measuring device (manufactured by Kyoto Electronics Industry Co., Ltd., trade name TPS 2500 S).

[α-Butyl-ω-(2-trimethoxysilylethyl)polydimethylsiloxane]

Surface treatment agent 1: α-butyl-ω-(2-trimethoxysilylethyl)polydimethylsiloxane, weight average molecular weight=1,400, viscosity at 25° C.=16 mPa·s, minimum coating area=55.9 m$^2$/g, specific gravity=0.97 g/cm$^3$ Surface treatment agent 2: α-butyl-ω-(2-trimethoxysilylethyl)polydimethylsiloxane, weight average molecular weight=3,000, viscosity at 25° C.=25 mPa·s, minimum coating area=26.1 m$^2$/g, specific gravity=0.97 g/cm$^3$ Surface treatment agent 3: α-butyl-ω-(2-trimethoxysilylethyl)polydimethylsiloxane, weight average molecular weight=4,000, viscosity at 25° C.=40 mPa·s, minimum coating area=19.6 m$^2$/g, specific gravity=0.97 g/cm$^3$

[Silane Coupling Agent]

Surface treatment agent 4: KBM-3103C, decyltrimethoxysilane, manufactured by Shin-Etsu Chemical Co., Ltd., molecular weight=262.5, minimum coating area=298 m$^2$/g, specific gravity=0.89 g/cm$^3$ Surface treatment agent 5: Dynasylan (registered trademark) 9116, hexadecyltrimethoxysilane, molecular weight=346.6, manufactured by Evonik Japan Co., Ltd., minimum coating area=226 m$^2$/g, specific gravity=0.89 g/cm$^3$ The minimum coating area of the surface treatment agent was calculated using the following formula (i).

In formula (i), the area occupied by the trimethoxysilyl group is 13×10$^{-20}$ m$^2$ for all of the α-butyl-ω-(2-trimethoxysilylethyl)polydimethylsiloxane, the decyltrimethoxysilane, and the hexadecyltrimethoxysilane.

$$\text{Minimum coating area } (\text{m}^2/\text{g}) \text{ of polydimethylsiloxane} = \frac{\text{Area } (\text{m}^2) \text{ occupied by the trimethoxysilyl groups in surface treatment agent} \times 6.02\times10^{23}}{\text{Weight average molecular weight of surface treatment agent}} \quad \text{(i)}$$

Example 1: Production of Surface-Treated Filler (1) Preparation of Treatment Liquid (Treatment Liquid Production Step)

The amount of surface treatment agent 1 used was calculated from the following formula (ii).

In formula (ii), the filler coverage was 100%.

$$\text{Amount (g) of surface treatment agent} = \frac{BET \text{ specific surface area } (\text{m}^2/\text{g}) \text{ of filler} \times \text{amount (g) of filler}}{\text{Minimum coating area } (\text{m}^2/\text{g}) \text{ of surface treatment agent}} \times \frac{\text{Coverage (\%)}}{100} \quad \text{(ii)}$$

10.4 parts by mass of surface treatment agent 1, 26 parts by mass of isopropanol, and 0.4 parts by mass of ion-exchanged water were added to a vial, sealed, and mixed for 3 days at a temperature of 25° C. and a rotation speed of 70 rpm using a mix rotor (VMR-5A, manufactured by AS ONE CORPORATION) to obtain a treatment liquid.

(2) Surface Treatment of Filler (Pre-Treatment Step, Drying Step, Heat Treatment Step)

To 100 parts by mass of AES-12 (alumina), the entire amount of the treatment liquid obtained in (1) above was added with a dropper, and using a rotation/revolution mixer (ARE-310, manufactured by THINKY CORPORATION), the mixture was stirred and mixed three times at a temperature of 25° C. and a rotation speed of 2000 rpm for 20 seconds, then air-dried at room temperature (25° C.) for 1 day to volatilize the solvent. Next, after heat treating at a temperature of 150° C. for 4 hours and baking the surface treatment agent 1, the resultant product was cooled at room temperature (25° C.) to obtain a surface-treated filler 1 surface-treated with surface treatment agent 1.

(3) Washing of Surface-Treated Filler

The obtained surface-treated filler 1 was washed by the following operation.

20 parts by mass of the surface-treated filler 1 was placed in a centrifuge tube, 10 parts by mass of isopropanol was added, the tube was capped, shaken up and down by hand for 30 seconds, and then shaken at 3000 rpm for 10 minutes using a centrifuge (CN-2060, manufactured by AS ONE CORPORATION) to cause the surface-treated filler 1 to sediment. After discarding the supernatant liquid and loosening the sediment, 10 parts by weight of isopropanol was added, the tube was capped, shaken up and down by hand for 30 seconds, and then shaken at 3000 rpm for 10 minutes using the centrifuge to cause the surface-treated filler 1 to sediment. The same procedure was repeated once more, the supernatant was discarded, and the sediment was left in the centrifuge tube to air-dry for one day. Then, the sediment was dried at a temperature of 100° C. for 1 hour.

Examples 2 to 19 and Comparative Examples 1 to 11: Production of Surface-Treated Filler Surface-treated fillers 2 to 30 of Examples 2 to 19 and Comparative Examples 1 to 11 were obtained in the same manner as in Example 1, except that the types and the amounts added of the filler and the treatment liquid were changed to as shown in Tables 1 and 2, and the heat treatment temperature and the heat treatment time were changed to as shown in Tables 1 and 2.

The amount of the surface treatment agent used in Examples 2 to 16 and Comparative Examples 1 to 8, 10, and 11 was calculated based on a filler coverage of 100% in formula (ii). The amount of the surface treatment agent used in Examples 17 to 19 and Comparative Example 9 was calculated based on a filler coverage of 33.3% in formula (ii).

(Evaluation)

For the obtained surface-treated fillers 1 to 30, the adhesion percentage of the surface treatment agent to the filler and the presence or absence of coloration of the surface-treated filler were evaluated. The results are shown in Tables 1 and 2.

[Adhesion Percentage of Surface Treatment Agent to Filler]

The adhesion percentage of the surface treatment agent was measured by a method conforming to JIS R1675:2007 "Combustion (high-frequency heating)—infrared absorption method". The total carbon content of the surface treatment agent and the total carbon content of the surface-treated filler after washing were each measured, and the adhesion percentage was calculated from the following formula (iii).

The carbon content of surface treatment agent 1 was 33.13% by mass, the carbon content of surface treatment agent 2 was 32.73% by mass, the carbon content of surface treatment agent 3 was 32.65% by mass, the carbon content of surface treatment agent 4 was 70.91% by mass, and the carbon content of surface treatment agent 5 was 75.79% by mass.

$$\text{Adhesion percentage (\% by mass) to filler} = \frac{\text{Total carbon content (g) of surface-treated filler after washing}}{\text{Total carbon content (g) of surface treatment agent}} \quad \text{(iii)}$$

[Presence or Absence of Coloration of Surface-Treated Filler]

The surface-treated fillers obtained in Examples 1 to 16 and Comparative Examples 1 to 8 were visually observed to evaluate the presence or absence of coloration.

TABLE 1

| | | | Treatment solution | | | Heat treatment temperature | Heat treatment time | Adhesion percentage (% by mass) of surface treatment | Presence/absence of coloration of surface- |
|---|---|---|---|---|---|---|---|---|---|
| | | Filler | Surface treatment agent | Water or aqueous acetic acid solution | Alcohol | [° C.] | (hours) | agent to filler | treated filler |
| Comparative Example 1 | Surface-treated filler 5 | AES-12, 100 parts by mass | Surface-treatment agent 1, 10.4 parts by mass | Ion-exchanged water, 0.4 parts by mass | Isopropanol, 26 parts by mass | 120 | 2 | 20.1 | absent |
| Comparative Example 2 | Surface-treated filler 6 | AES-12, 100 parts by mass | Surface-treatment agent 1, 10.4 parts by mass | Ion-exchanged water, 0.4 parts by mass | Isopropanol, 26 parts by mass | 120 | 4 | 20.2 | absent |
| Example 1 | Surface-treated filler 1 | AES-12, 100 parts by mass | Surface-treatment agent 1, 10.4 parts by mass | Ion-exchanged water, 0.4 parts by mass | Isopropanol, 26 parts by mass | 150 | 4 | 28.7 | absent |
| Example 2 | Surface-treated filler 2 | AES-12, 100 parts by mass | Surface-treatment agent 1, 10.4 parts by mass | Ion-exchanged water, 0.4 parts by mass | Isopropanol, 26 parts by mass | 160 | 4 | 33.2 | absent |
| Example 3 | Surface-treated filler 3 | AES-12, 100 parts by mass | Surface-treatment agent 1, 10.4 parts by mass | Ion-exchanged water, 0.4 parts by mass | Isopropanol, 26 parts by mass | 170 | 4 | 32.1 | absent |
| Example 4 | Surface-treated filler 4 | AES-12, 100 parts by mass | Surface-treatment agent 1, 10.4 parts by mass | Ion-exchanged water, 0.4 parts by mass | Isopropanol, 26 parts by mass | 170 | 16 | 33.3 | present |
| Comparative Example 3 | Surface-treated filler 7 | AES-12, 100 parts by mass | Surface-treatment agent 1, 10.4 parts by mass | Aqueous solution of 10% by mass acetic acid, 0.4 parts by mass | Isopropanol, 26 parts by mass | 120 | 2 | 23.1 | absent |
| Comparative Example 4 | Surface-treated filler 8 | AES-12, 100 parts by mass | Surface-treatment agent 1, 10.4 parts by mass | Aqueous solution of 10% by mass acetic acid, 0.4 parts by mass | Isopropanol, 26 parts by mass | 120 | 4 | 23.3 | absent |
| Example 5 | Surface-treated filler 9 | AES-12, 100 parts by mass | Surface-treatment agent 1, 10.4 parts by mass | Aqueous solution of 10% by mass acetic acid, 0.4 parts by mass | Isopropanol, 26 parts by mass | 150 | 4 | 33.5 | absent |
| Example 6 | Surface-treated filler 10 | AES-12, 100 parts by mass | Surface-treatment agent 1, 10.4 parts by mass | Aqueous solution of 10% by mass acetic acid, 0.4 parts by mass | Isopropanol, 26 parts by mass | 160 | 4 | 34.8 | absent |
| Example 7 | Surface-treated filler 11 | AES-12, 100 parts by mass | Surface-treatment agent 1, 10.4 parts by mass | Aqueous solution of 10% by mass acetic acid, 0.4 parts by mass | Isopropanol, 26 parts by mass | 170 | 4 | 35.1 | absent |
| Example 8 | Surface-treated filler 12 | AES-12, 100 parts by mass | Surface-treatment agent 1, 10.4 parts by mass | Aqueous solution of 10% by mass acetic acid, 0.4 parts by mass | Isopropanol, 26 parts by mass | 170 | 16 | 35.1 | present |
| Comparative Example 5 | Surface-treated filler 13 | AES-12, 100 parts by mass | Surface-treatment agent 2, 22.2 parts by mass | Ion-exchanged water, 0.4 parts by mass | Isopropanol, 56 parts by mass | 120 | 2 | 20.1 | absent |
| Comparative Example 6 | Surface-treated filler 14 | AES-12, 100 parts by mass | Surface-treatment agent 2, 22.2 parts by mass | Ion-exchanged water, 0.4 parts by mass | Isopropanol, 56 parts by mass | 120 | 4 | 20.5 | absent |
| Example 9 | Surface-treated filler 15 | AES-12, 100 parts by mass | Surface-treatment agent 2, 22.2 parts by mass | Ion-exchanged water, 0.4 parts by mass | Isopropanol, 56 parts by mass | 150 | 4 | 24.0 | absent |
| Example 10 | Surface-treated filler 16 | AES-12, 100 parts by mass | Surface-treatment agent 2, 22.2 parts by mass | Ion-exchanged water, 0.4 parts by mass | Isopropanol, 56 parts by mass | 160 | 4 | 27.2 | absent |
| Example 11 | Surface-treated filler 17 | AES-12, 100 parts by mass | Surface-treatment agent 2, 22.2 parts by mass | Ion-exchanged water, 0.4 parts by mass | Isopropanol, 56 parts by mass | 170 | 4 | 27.0 | absent |
| Example 12 | Surface-treated filler 18 | AES-12, 100 parts by mass | Surface-treatment agent 2, 22.2 parts by mass | Ion-exchanged water, 0.4 parts by mass | Isopropanol, 56 parts by mass | 170 | 16 | 27.3 | present |
| Comparative Example 7 | Surface-treated filler 19 | AES-12, 100 parts by mass | Surface-treatment agent 2, 22.2 parts by mass | Aqueous solution of 10% by mass acetic acid, 0.4 parts by mass | Isopropanol, 56 parts by mass | 120 | 2 | 19.6 | absent |
| Comparative Example 8 | Surface-treated filler 20 | AES-12, 100 parts by mass | Surface-treatment agent 2, 22.2 parts by mass | Aqueous solution of 10% by mass acetic acid, 0.4 parts by mass | Isopropanol, 56 parts by mass | 120 | 4 | 20.1 | absent |
| Example 13 | Surface-treated filler 21 | AES-12, 100 parts by mass | Surface-treatment agent 2, 22.2 parts by mass | Aqueous solution of 10% by mass acetic acid, 0.4 parts by mass | Isopropanol, 56 parts by mass | 150 | 4 | 21.0 | absent |

TABLE 1-continued

| | | | Treatment solution | | | Heat treatment temperature | Heat treatment time | Adhesion percentage (% by mass) of surface treatment | Presence/absence of coloration of surface- |
|---|---|---|---|---|---|---|---|---|---|
| | | Filler | Surface treatment agent | Water or aqueous acetic acid solution | Alcohol | [° C.] | (hours) | agent to filler | treated filler |
| Example 14 | Surface-treated filler 22 | AES-12, 100 parts by mass | Surface-treatment agent 2, 22.2 parts by mass | Aqueous solution of 10% by mass acetic acid, 0.4 parts by mass | Isopropanol, 56 parts by mass | 160 | 4 | 22.4 | absent |
| Example 15 | Surface-treated filler 23 | AES-12, 100 parts by mass | Surface-treatment agent 2, 22.2 parts by mass | Aqueous solution of 10% by mass acetic acid, 0.4 parts by mass | Isopropanol, 56 parts by mass | 170 | 4 | 22.0 | absent |
| Example 16 | Surface-treated filler 24 | AES-12, 100 parts by mass | Surface-treatment agent 2, 22.2 parts by mass | Aqueous solution of 10% by mass acetic acid, 0.4 parts by mass | Isopropanol, 56 parts by mass | 170 | 16 | 22.0 | present |

TABLE 2

| | Filler | | Treatment solution | | | Heat | Heat | Adhesion percentage |
|---|---|---|---|---|---|---|---|---|
| | | | Surface treatment agent | Water or aqueous acetic acid solution | Alcohol | treatment temperature [° C.] | treatment time (hours) | (% by mass) of surface treatment agent to filler |
| Example 17 | Surface-treated filler 25 | AES-12:BAK-5 = 4:5 (mass ratio) (AES-12: 40 parts by mass, BAK-5: 50 parts by mass) | Surface-treatment agent 1, 1.50 parts by mass | Ion-exchanged water, 0.06 parts by mass | Isopropanol, 3.75 parts by mass | 160 | 4 | 44.3 |
| Example 18 | Surface-treated filler 26 | | Surface-treatment agent 2, 3.22 parts by mass | Ion-exchanged water, 0.06 parts by mass | Isopropanol, 8.05 parts by mass | 160 | 4 | 31.3 |
| Example 19 | Surface-treated filler 27 | | Surface treatment agent 3, 4.29 parts by mass | Ion-exchanged water, 0.06 parts by mass | Isopropanol, 10.7 parts by mass | 160 | 4 | 29.6 |
| Comparative Example 9 | Surface-treated filler 28 | | Surface treatment agent 3, 1.50 parts by mass | Ion-exchanged water, 0.06 parts by mass | Isopropanol, 10.7 parts by mass | 120 | 2 | 19.2 |
| Comparative Example 10 | Surface-treated filler 29 | | Surface treatment agent 4, 0.93 parts by mass | Ion-exchanged water, 0.19 parts by mass | Isopropanol, 2.33 parts by mass | 120 | 2 | 64.1 |
| Comparative Example 11 | Surface-treated filler 30 | | Surface treatment agent 5, 1.22 parts by mass | Ion-exchanged water, 0.19 parts by mass | Isopropanol, 3.10 parts by mass | 120 | 2 | 53.3 |

From Tables 1 and 2, it can be seen that according to the method for producing a surface-treated filler of the present invention, a surface-treated filler can be obtained in which the surface treatment agent [α-butyl-ω-(2-trimethoxysilyl-ethyl)polydimethylsiloxane] is fixed to the filler surface at an adhesion percentage in the range from 20.0 to 50.0% by mass. It can also be seen that the lower the weight-average molecular weight of the surface treatment agent, the higher the adhesion percentage of the surface treatment agent to the filler. In addition, it can be seen that the higher the heat treatment temperature, the higher the adhesion percentage of the surface treatment agent to the filler. On the other hand, coloration was observed in the surface-treated filler obtained with a heat treatment time of 16 hours. This is probably because the surface treatment agent degrades as the heat treatment time increases.

Example 20: Production of Heat Conducting Composition

A polyethylene container was charged with 75.0 parts by mass of vinyl group-containing dimethyl silicone rubber (DOWSIL™ CY52-276) as the polymer component and 900.0 parts by mass of the surface-treated filler 26 as a filler, and the mixture was stirred and mixed with a rotation/revolution mixer (manufactured by THINKY CORPORATION) at a rotation speed of 2000 rpm for 30 seconds. After cooling, the mixture was loosened, 943.0 parts by mass of alumina (AS-10) was further added, and the mixture was stirred and mixed with a rotation/revolution mixer at a rotation speed of 2000 rpm for 30 seconds to obtain a heat conducting composition of Example 20.

Examples 21 and 22 and Comparative Examples 12 to 15: Production of Heat Conducting Composition A heat conducting composition of each example and comparative example was obtained in the same manner as in Example 20, except that the types and amounts of each component were changed to as shown in Table 3.

Comparative Example 16: Production of Heat Conducting Composition

A polyethylene container was charged with 77.3 parts by mass of a silicone resin solution A (containing platinum catalyst), 32.2 parts by mass of the surface treatment agent 2, 400 parts by mass of AES-12 (alumina), and 500 parts by mass of BAK-5 (alumina), and the mixture was stirred and mixed with a rotation/revolution mixer (manufactured by THINKY CORPORATION) at a rotation speed of 2000 rpm for 30 seconds. After cooling, the mixture was loosened, 977.0 parts by mass of AS-10 (alumina) was further added, the mixture was stirred and mixed with the rotation/revolution mixer at a rotation speed of 2000 rpm for 30 seconds, and then cooled to obtain a heat conducting composition A.

Similarly, a polyethylene container was charged with 77.3 parts by mass of a silicone resin solution B (containing a cross-linking agent), 32.2 parts by mass of the surface treatment agent 2, 400 parts by mass of AES-12 (alumina), and 500 parts by mass of BAK-5 (alumina), and the mixture was stirred and mixed with a rotation/revolution mixer (manufactured by THINKY CORPORATION) at a rotation speed of 2000 rpm for 30 seconds. After cooling, the mixture was loosened, 977.0 parts by mass of AS-10 (alumina) was further added, the mixture was stirred and mixed with the rotation/revolution mixer at a rotation speed of 2000 rpm for 30 seconds, and then cooled to obtain a heat conducting composition B.

The heat conducting composition A and the heat conducting composition B were weighed into a polyethylene container in a 1:1 mass ratio, and stirred and mixed under vacuum for 20 seconds at a rotation speed of 2000 rpm using a rotation/revolution mixer (ARE-310, manufactured by THINKY CORPORATION) to obtain the heat conducting composition of Comparative Example 16.

Comparative Examples 17 and 18: Production of Heat Conducting Composition

A heat conducting composition of each comparative example was obtained in the same manner as in Comparative Example 16, except that the types and amounts added of the components were changed to as shown in Table 3.

Comparative Example 19: Production of Heat Conducting Composition

A polyethylene container was charged with 77.3 parts by mass of a silicone resin solution A (containing platinum catalyst), 32.2 parts by mass of the surface treatment agent 2, 400 parts by mass of AES-12 (alumina), and 500 parts by mass of BAK-5 (alumina), and the mixture was stirred and mixed with a rotation/revolution mixer (manufactured by THINKY CORPORATION) at a rotation speed of 2000 rpm for 30 seconds. After cooling, the mixture was loosened, 977.0 parts by mass of AS-10 (alumina) was further added, the mixture was stirred and mixed with the rotation/revolution mixer at a rotation speed of 2000 rpm for 30 seconds, and then cooled to obtain a heat conducting composition A. The obtained heat conducting composition A was transferred to a metal container to allow heating. The metal container containing the heat conducting composition A was placed in a hot air circulation oven set at 160° C., taken out every 30 minutes, stirred and mixed at 2000 rpm for 30 seconds. After repeating this operation 8 times, the heat conducting composition was cooled. Next, 40 ppm by mass of a platinum catalyst was added with a microsyringe. The reason for adding the platinum catalyst was that a platinum catalyst which had been already added to the silicone resin A solution was deactivated by the heating, and so it was additionally added.

A heat conducting composition B was obtained by subjecting 77.3 parts by mass of a silicone resin B solution (containing a cross-linking agent) to the same operation as the silicone resin A solution.

The heat conducting composition A and the heat conducting composition B were weighed into a polyethylene container in a 1:1 mass ratio, and stirred and mixed under vacuum for 20 seconds at a rotation speed of 2000 rpm using a rotation/revolution mixer (ARE-310, manufactured by THINKY CORPORATION) TO obtain the heat conducting composition of Comparative Example 19.

Sheet Production

A defoamed heat conducting composition was placed on a polyester film having a thickness of 0.1 mm that had been subjected to a fluorine release treatment, then a polyester film having a thickness of 0.1 mm was placed thereon to prevent air from entering, molding was carried out with a rolling roll, curing was carried out at 120° C. for 60 minutes, and the cured sheet was further left at room temperature (23° C.) for one day, whereby a sheet (cured product of the heat conducting composition) having a thickness of 2.0 mm was produced. In Comparative Example 15, the filler could not be filled into the polymer component, and a sheet could not be produced.

Further, the sheets obtained by curing the heat conducting compositions of Comparative Examples 14 and 16 to 19 had bubbles on the surface.

(Evaluation)

Characteristics were measured using the heat conducting composition and the sheet of the heat conducting composition obtained in each example and comparative example under the measurement conditions shown below. The results are shown in Table 3.

(1) Filler Content (% by Volume)

The filler content (% by volume) based on the total heat conducting composition was calculated using the following formula (iv).

The volume of the surface-treated filler represents the volume of the filler before the filler is surface-treated, and the volume of the polymer component is the total of the volume of the polymer component and the volume of the surface treatment agent used for the surface treatment of the filler.

$$\text{Filler content (\% by volume)} = \frac{\text{Volume (cm}^3\text{) of filler}}{\text{Volume (cm}^3\text{) of polymer component} + \text{volume (cm}^3\text{) of filler}} \times 100 \quad \text{(iV)}$$

$$\text{Filler volume (cm}^3\text{)} = \frac{\text{Amount (g) of filler}}{\text{Specific gravity (g/cm}^3\text{) of filler}}$$

$$\text{Polymer component volume (cm}^3\text{)} = \frac{\text{Amount (g) of polymer component}}{\text{Specific gravity (g/cm}^3\text{) of polymer component}} + \frac{\text{Amount (g) of surface treatment agent}}{\text{Specific gravity (g/cm}^3\text{) of surface treatment agent}}$$

(2) Viscosity

Viscosity was measured in accordance with JIS K7210: 2014 using a flow viscometer (OFT-100EX, manufactured by Shimadzu Corporation) at a temperature of 30° C., a die hole size (diameter) of 1.0 mm, and a test force of 10 (weight 1.8 kg).

(3) Hardness (Shore 00 Hardness)

The obtained sheet having a thickness of 2.0 mm was cut into strips of 20 mm in width and 30 mm in length. Two blocks made by stacking three strips on top of each other were used as a measurement sample. Using an Asker C hardness tester (Asker C rubber hardness tester, manufactured by Kobunshi Keiki Co., Ltd.), the Shore 00 hardness of the measurement sample was measured according to ASTM D2240 hardness test (Shore 00).

In addition, when the Shore 00 hardness was 20 or less, the sheet did not separate from the release film, and it was determined that the curing was insufficient.

(4) Thermal Conductivity

The obtained sheet having a thickness of 2.0 mm was cut into strips with a width of 20 mm and a length of 30 mm. Two blocks made by stacking three strips on top of each other were prepared, and the surface of the blocks was covered with wrap to produce two measurement samples. The thermal conductivity was measured by setting the probes of a hot disk method measuring device (manufactured by Kyoto Electronics Industry Co., Ltd., TPS-2500) conforming to ISO 22007-2:2008 in such a way that the probes sandwiched the measurement samples from above and below.

TABLE 3

| Filler treatment conditions | | Pre-treatment | | | | | |
|---|---|---|---|---|---|---|---|
| | | Example 20 | Example 21 | Example 22 | Comparative Example 12 | Comparative Example 13 | Comparative Example 14 |
| Polymer component (parts by mass) | DOWSIL ™ CY52-276 | 75.0 | 93.5 | 66.3 | 100.0 | 97.0 | 66.3 |
| Filler (parts by mass) | Surface-treatment agent 1 | — | — | — | — | — | — |
| | Surface-treatment agent 2 | — | — | — | — | — | — |
| | Surface treatment agent 3 | — | — | — | — | — | — |
| | Surface-treated filler 25 | — | 900.0 | — | — | — | — |
| | Surface-treated filler 26 | 900.0 | — | — | — | — | — |
| | Surface-treated filler 27 | — | — | 900.0 | — | — | — |
| | Surface-treated filler 28 | — | — | — | — | — | 900.0 |
| | Surface-treated filler 29 | — | — | — | 900.0 | — | — |
| | Surface-treated filler 30 | — | — | — | — | 900.0 | — |
| | AES-12/BAK-5 = 4/5 (mass ratio) (no surface treatment) | — | — | — | — | — | — |
| | AS-10 | 943.0 | 961.0 | 933.0 | 977.0 | 977.0 | 932.2 |
| Content (% by volume) of filler contained in composition | | 80.7 | 80.7 | 80.7 | 80.7 | 80.7 | 80.7 |
| Content (% by mass) of polymer component contained in composition | | 3.9 | 4.8 | 3.5 | 5.1 | 4.9 | 3.5 |
| Content (% by mass) of filler contained in composition | | 96.1 | 95.2 | 96.5 | 94.9 | 95.1 | 96.5 |
| Content (% by mass) of surface-treated fillers 25 to 27 contained in filler | | 48.8 | 48.4 | 49.0 | 0.0 | 0.0 | 0.0 |
| Viscosity (Pa · s) | | 340 | 452 | 363 | 1200 | 702 | 340 |
| Hardness (Shore 00) | | 39 | 40 | 37 | 95 | 96 | 13 |
| Thermal conductivity (W/m · K) | | 5.01 | 5.03 | 5.09 | 5.21 | 5.49 | —*[1] |

| Filler treatment conditions | | None | Integral blend method | | | |
|---|---|---|---|---|---|---|
| | | Comparative Example 15 | Comparative Example 16 | Comparative Example 17 | Comparative Example 18 | Comparative Example 19 |
| Polymer component (parts by mass) | DOWSIL ™ CY52-276 | 109.5 | 77.3 | 94.5 | 66.6 | 77.3 |
| Filler (parts by mass) | Surface-treatment agent 1 | — | — | 15.0 | — | — |
| | Surface-treatment agent 2 | — | 32.2 | — | — | 32.2 |
| | Surface treatment agent 3 | — | — | — | 42.9 | — |
| | Surface-treated filler 25 | — | — | — | — | — |
| | Surface-treated filler 26 | — | — | — | — | — |
| | Surface-treated filler 27 | — | — | — | — | — |
| | Surface-treated filler 28 | — | — | — | — | — |
| | Surface-treated filler 29 | — | — | — | — | — |
| | Surface-treated filler 30 | — | — | — | — | — |
| | AES-12/BAK-5 = 4/5 (mass ratio) (no surface treatment) | 900.0 | 900.0 | 900.0 | 900.0 | 900.0 |
| | AS-10 | 977.0 | 977.0 | 977.0 | 977.0 | 977.0 |
| Content (% by volume) of filler contained in composition | | 80.7 | 80.7 | 80.7 | 80.7 | 80.7 |
| Content (% by mass) of polymer component contained in composition | | 5.5 | 3.9 | 4.8 | 3.4 | 3.9 |
| Content (% by mass) of filler contained in composition | | 94.5 | 96.1 | 95.2 | 96.6 | 96. |
| Content (% by mass) of surface-treated fillers 25 to 27 contained in filler | | 0.0 | 0.0 | 0.0 | 0.0 | 0.0 |
| Viscosity (Pa · s) | | —*[2] | 300 | 415 | 320 | 305 |
| Hardness (Shore 00) | | —*[2] | —*[3] | 9 | —*[3] | 11 |
| Thermal conductivity (W/m · K) | | —*[2] | —*[3] | —*[1] | —*[3] | —*[1] |

*[1]Measurement not possible because curing was insufficient.
*[2]Measurement not possible because filler could not be filled in polymer component.
*[3]Measurement not possible because curing did not occur.

It can be seen that, as compared with the heat conducting compositions of Comparative Examples 12 and 13, which included a filler surface-treated with a silane coupling agent, the heat conducting compositions of Examples 20 to 22 containing the surface-treated filler of the present invention, all had a low viscosity as well as a low hardness that is an appropriate hardness, and that a cured product having a high thermal conductivity could be obtained. The heat conducting composition containing a surface-treated filler having a low heat treatment temperature (120° C.) during the production of the surface-treated filler had a Shore 00 hardness of 20 or less, which is too low, due to insufficient curing (Comparative Example 14). Further, filler that had not been surface-treated could not fill the polymer component (Comparative Example 15). When the filler was surface-treated by an integral blend method using surface treatment agents 1 to 3, the composition did not cure (Comparative Examples 16 and 18) or was insufficiently cured (Comparative Example 17). Although curability was slightly better when heat was applied, the curing was insufficient (Comparative Example 19).

The invention claimed is:

1. A surface-treated filler obtained by surface-treating a surface of a filler with α-butyl-ω-(2-trimethoxysilylethyl) polydimethylsiloxane having a weight average molecular weight of 500 to 5,000, wherein an adhesion percentage of the α-butyl-ω-(2-trimethoxysilylethyl) polydimethylsiloxane to the filler is from 20.0 to 50.0% by mass.

2. The surface-treated filler according to claim 1, wherein the filler comprises at least one material selected from the group consisting of metal oxides, nitrides, and composite oxides.

3. The surface-treated filler according to claim 1, wherein the filler has a cumulative volume-based 50% particle size of from 0.1 to 30 μm.

4. A heat conducting composition comprising:

a polymer component; and a filler, wherein the filler comprises the surface-treated filler according to claim 1, and a content of the polymer component is from 2 to 15% by mass and a content of the filler is from 85 to 98% by mass based on the total amount of the heat conducting composition.

5. The heat conducting composition according to claim 4, wherein a content of the surface-treated filler comprised in the filler is from 40 to 60% by mass.

6. The heat conducting composition according to claim 4, wherein the polymer component is at least one selected from the group consisting of a thermosetting resin and an elastomer.

7. A cured product comprising the heat conducting composition according to claim 4.

8. The cured product according to claim 7, wherein the cured product has a thermal conductivity of 4.0 W/m·K or more.

* * * * *